Duvall & Winterbottom,
Head Block.
No. 103,032. Patented May 17, 1870.
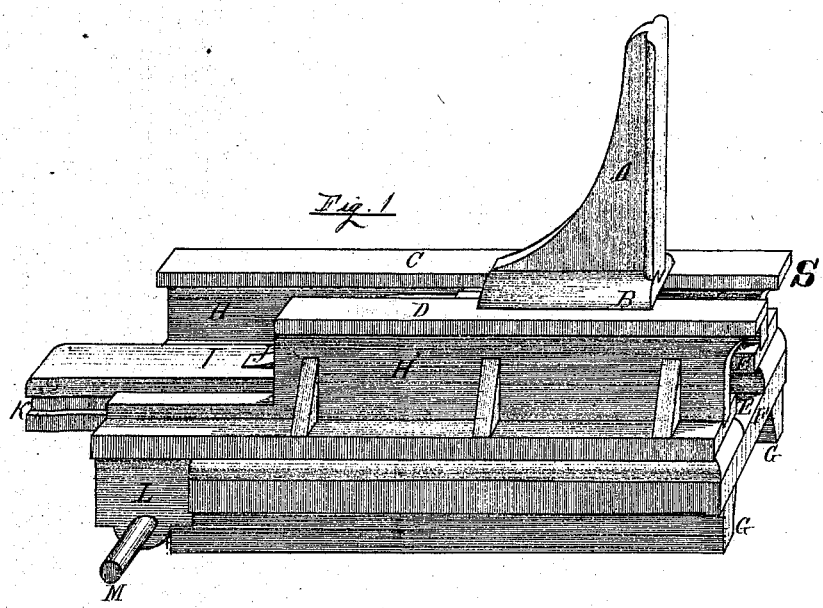
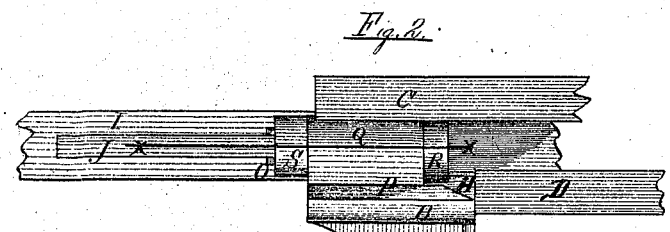
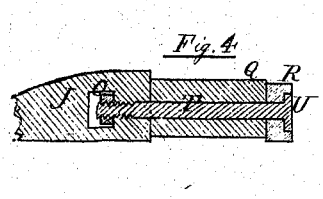
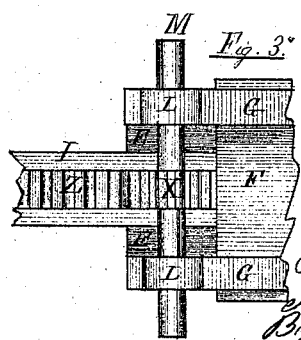
Witnesses
E. E. Gibson
J. L. Meriam
Inventors
Joseph Duvall,
John Winterbottom,
By their Attorney,
G. L. Chapin.

United States Patent Office.

JOSEPH DUVALL AND JOHN WINTERBOTTOM, OF KEWAUNEE, WISCONSIN.

Letters Patent No. 103,032, dated May 17, 1870.

IMPROVEMENT IN HEAD-BLOCKS FOR SAWMILLS.

The Schedule referred to in these Letters Patent and making part of the same

To all whom it may concern:

Be it known that we, JOSEPH DUVALL and JOHN WINTERBOTTOM, of Kewaunee, in the county of Kewaunee and State of Wisconsin, have invented a Head-block for Circular Sawmills; and we do hereby declare that the following is a full and exact description thereof, reference being had to the accompanying drawings and letters marked thereon making a part of this description, in which—

Figure 1 is a perspective representation of a head-block for circular sawmills, with my improvement attached.

Figure 2 a plan view of a part of the block, showing the knee in position as it is when turned down.

Figure 3 an inverted broken view of the head-block, showing the rack and pinion for moving the knee.

Figure 4 a vertical section, on line x x, fig. 2, of the knee-carriage, showing how the knee is hinged to it.

The present invention consists in so forming the head-block for circular sawmills by cutting away a portion of one side thereof so that the hinged knee may fold down at the side of said block, so as to be out of the way of logs when being rolled thereon, as the whole is hereinafter fully described.

H H represents the vertical sides of the ordinary head-block now in use in circular sawmills, and I the carriage to which the knee A is attached, said carriage being provided with a rack, Z, fig. 3, on its under side; is moved back and forth in the block H H by means of a pinion, X, in the usual manner.

The knee A has heretofore been rigidly attached to the carriage I, and, as a consequence, logs could only be put onto the head-block at its end, S, nearest to the circular saw, involving a loss of time, and bring the logs over the lumber-way.

We remedy this objection by hinging the knee A to its carriage I by means of projecting ears R S, a bolt, U T, and nut O, as shown at figs. 2 and 4, so that the knee can be turned down, as shown in fig. 2, a sufficient portion of one of the sides H of the head-block being cut away to admit of the knees having that position, as shown at figs. 1 and 2.

In other respects the knee is quite similar to the stationary knee, its base, B, being provided with grooves to run on the guides or flanges C D, attached to the top part of the head-block.

A knee constructed and arranged on our plan will hold or move a log in the same manner as the fixed knee, while, at the same time, it can, when run back to the proper place, be turned down below the top of the head-block, so that lumber or logs can be put on or off at either side of the main carriage.

We are aware that folding knees have been before used, but not as herein shown or combined.

Having thus described our invention,

We claim—

A sawmill head-block, constructed as shown and described.

JOSEPH DUVALL.
JOHN WINTERBOTTOM.

Witnesses:
R. S. WING,
DE WAYNE STEBBINS.